United States Patent
Cho et al.

(10) Patent No.: US 8,370,103 B2
(45) Date of Patent: Feb. 5, 2013

(54) INFORMATION PROCESSING APPARATUS AND METHOD

(75) Inventors: Kenta Cho, Tokyo (JP); Masanori Hattori, Kanagawa-ken (JP); Naoki Iketani, Kanagawa-ken (JP); Keisuke Nishimura, Kanagawa-ken (JP); Masaaki Kikuchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 278 days.

(21) Appl. No.: 12/539,720

(22) Filed: Aug. 12, 2009

(65) Prior Publication Data

US 2010/0070235 A1 Mar. 18, 2010

(30) Foreign Application Priority Data

Sep. 16, 2008 (JP) ................................ 2008-236821

(51) Int. Cl.
*G01P 15/00* (2006.01)
(52) U.S. Cl. ........................ 702/141; 702/150
(58) Field of Classification Search .................. 702/141, 702/142, 149, 150, 160, 176, 187, 188; 324/162; 700/304; 713/100
See application file for complete search history.

(56) References Cited

U.S. PATENT DOCUMENTS

| | | | |
|---|---|---|---|
| 6,571,193 B1 * | 5/2003 | Unuma et al. ................. | 702/141 |
| 2001/0040591 A1 * | 11/2001 | Abbott et al. .................. | 345/700 |
| 2007/0091292 A1 * | 4/2007 | Cho et al. ......................... | 355/75 |
| 2009/0132197 A1 * | 5/2009 | Rubin et al. .................. | 702/141 |

FOREIGN PATENT DOCUMENTS

| | | |
|---|---|---|
| JP | 10-024026 | 1/1998 |
| JP | 10-111877 | 4/1998 |
| JP | 2002-048589 | 2/2002 |
| JP | 2004-045413 | 2/2004 |
| JP | 2004-102928 | 4/2004 |
| JP | 2008-160886 | 7/2008 |
| WO | 2004077291 | 9/2004 |

OTHER PUBLICATIONS

Japanese Office Action for Japanese Application No. 2008-236821 mailed on Oct. 2, 2012.

* cited by examiner

*Primary Examiner* — Manuel L Barbee
(74) *Attorney, Agent, or Firm* — Turocy & Watson, LLP

(57) ABSTRACT

A moving context and a moving time of a user are specified by acceleration information while the user is moving. The moving context represents the user's moving status. The acceleration information is measured by an acceleration sensor carried with the user. The moving context and the moving time are stored in time series. The moving context and the moving time between a moving start time and an arrival time are set as a moving pattern. A tag is set to the moving context in the moving pattern. The tag identifies a function to be executed for the moving context. A moving estimation pattern is generated as the moving pattern having the moving context and the moving time specified by acceleration information measured when the user is newly moving. The function identified by the tag is executed, when the moving context set with the tag in the moving estimation pattern coincides with a moving context specified by acceleration information measured while the user is newly moving.

13 Claims, 12 Drawing Sheets

| PATTERN ID | WEEKDAY / HOLIDAY | DAY OF THE WEEK | START TIME | TIME SEQUENCE |
|---|---|---|---|---|
| 1 | WEEKDAY | — | 8:30 | 10-20-5-15-10-30-10 |
| 2 | WEEKDAY | — | 19:00 | 10-30-10-15-5-20-10 |
| 3 | — | TUESDAY | 17:00 | 15-10-5 |
| 4 | HOLIDAY | — | 12:00 | 10-20-5-15-10 |
| 5 | WEEKDAY | WEDNESDAY | 13:00 | 15-10-5 |
| ⋮ | ⋮ | ⋮ | ⋮ | ⋮ |

FIG. 2

| PROPERTY | TAG NAME | PATTERN ID | TIME SEQUENCE NUMBER | ADDITIONAL CONDITION |
|---|---|---|---|---|
| STATUS | [SHIBUYA] | 1 | 3 | |
| | [SHIBUYA] | 2 | 5 | |
| | [FUTAKOTAMAGAWA] | 1 | 1 | LAST FIVE MINUTES |
| | [COMPANY] | 1, 2 | — | BETWEEN PATTERNS |
| | [GO HOME] | 2 | ALL | |
| | [HOUSE] | 1 | — | BEFORE PATTERN |
| | [HOUSE] | 2 | — | AFTER PATTERN |
| | ⋮ | ⋮ | ⋮ | ⋮ |
| ToDo | [POST] | 1 | 3 | |
| | ⋮ | ⋮ | ⋮ | ⋮ |

FIG. 3

| LIFE CONTEXT TAG | EXECUTION FUNCTION |
|---|---|
| [RIDING] | SILENT MODE "ON" |
| [FUTAKOTAMAGAWA] | GUIDANCE OF CHANGE |
| [POST] | SENDING A MAIL TO POST |
| ⋮ | ⋮ |

| PATTERN ID | STATUS | TIME SEQUENCE NUMBER |
|---|---|---|
| 1 | INTER-PATTERN | 3 |
| 2 | BEFORE PATTERN | — |
| ⋮ | ⋮ | ⋮ |

| TRANSITION SOURCE | TRANSITION DESTINATION | | | |
|---|---|---|---|---|
| | RUNNING | WALKING | RIDING | STILLNESS |
| RUNNING | 1 | 0.5 | 0.5 | 0.25 |
| WALKING | 0.5 | 1 | 0.75 | 0.75 |
| RIDING | 0.5 | 0.75 | 1 | 0.25 |
| STILLNESS | 0.25 | 0.75 | 0.25 | 1 |

| DATE | START TIME | TIME SEQUENCE | |
|---|---|---|---|
| 1/15 (MON) | 8:15 | 10-20-5-15-10-30-10 | ─1201 |
| 1/15 (MON) | 19:25 | 10-30-60-15-10-20-10 | |
| 1/16 (TUE) | 9:00 | 10-25-10-15-15-40-10 | |
| 1/16 (TUE) | 17:00 | 15-10-5 | |
| 1/16 (TUE) | 19:30 | 60-15-5-20-15-20-5 | |
| ⋮ | ⋮ | ⋮ | |

FIG. 11

INFORMATION PROCESSING APPARATUS AND METHOD

CROSS-REFERENCE TO RELATED APPLICATIONS

This application is based upon and claims the benefit of priority from Japanese Patent Application No. 2008-236821, filed on Sep. 16, 2008; the entire contents of which are incorporated herein by reference.

FIELD OF THE INVENTION

The present invention relates to an information processing apparatus and a method for executing a function based on a user's moving status.

BACKGROUND OF THE INVENTION

Usually, a user is moving with a computer terminal such as a mobile phone terminal. Accordingly, technique to present various services from the computer terminal to the user, while the user is moving, is proposed.

On the other hand, various kinds of sensors are loaded onto the computer terminal. By this sensor, the user's moving status can be estimated to some extent.

For example, by loading an acceleration sensor onto the computer terminal (carried by the user), technique to estimate the user's behavior from the acceleration sensor is disclosed in JP-A H10-024026 (Kokai). As to this technique, from information detected by the acceleration sensor, the user's various behavior, i.e., walking, sitting, conferring, or eating, is specified.

However, information directly acquired from the acceleration sensor is few. Accordingly, even if the user's. behavior is specified, the user's moving status cannot be correctly decided. As a result, a suitable service cannot be presented to the user based on the user's moving status.

SUMMARY OF THE INVENTION

The present invention is directed to an information processing apparatus and a method for executing a suitable function by correctly deciding the user's moving status.

According to an aspect of the present invention, there is provided an apparatus for processing information, comprising: a specifying unit configured to specify a moving context and a moving time of a user by acceleration information while the user is moving, the moving context representing the user's moving status, the acceleration information being measured by an acceleration sensor carried with the user; a storage unit configured to store the moving context and the moving time in time series; a pattern setting unit configured to set the moving context and the moving time stored in the storage unit, from a moving start time to an arrival time to a destination, as a moving pattern from the moving start time; a tag setting unit configured to set a tag to the moving context in the moving pattern, the tag identifying a function to be executed for the moving context; an estimation unit configured to generate a moving estimation pattern as the moving pattern having the moving context and the moving time specified by acceleration information which is measured when the user is newly moving; and an execution unit configured to execute the function identified by the tag, when the moving context set with the tag in the moving estimation pattern coincides with a moving context specified by acceleration information which is measured while the user is newly moving.

According to another aspect of the present invention, there is also provided a method for processing information, comprising: specifying a moving context and a moving time of a user by acceleration information while the user is moving, the moving context representing the user's moving status, the acceleration information being measured by an acceleration sensor carried with the user; storing the moving context and the moving time in time series, in a memory; setting the moving context and the moving time stored in the memory, from a moving start time to an arrival time to a destination, as a moving pattern from the moving start time; setting a tag to the moving context in the moving pattern, the tag identifying a function to be executed for the moving context; generating a moving estimation pattern as the moving pattern having the moving context and the moving time specified by acceleration information which is measured when the user is newly moving; and executing the function identified by the tag, when the moving context set with the tag in the moving estimation pattern coincides with a moving context specified by acceleration information which is measured while the user is newly moving.

According to still another aspect of the present invention, there is also provided a computer readable medium storing program codes for causing a computer to process information, the program codes comprising: a first program code to specify a moving context and a moving time of a user by acceleration information while the user is moving, the moving context representing the user's moving status, the acceleration information being measured by an acceleration sensor carried with the user; a second program code to store the moving context and the moving time in time series, in a memory; a third program code to set the moving context and the moving time stored in the memory, from a moving start time to an arrival time to a destination, as a moving pattern from the moving start time; a fourth program code to set a tag to the moving context in the moving pattern, the tag identifying a function to be executed for the moving context; a fifth program code to generate a moving estimation pattern as the moving pattern having the moving context and the moving time specified by acceleration information which is measured when the user is newly moving; and a sixth program code to execute the function identified by the tag, when the moving context set with the tag in the moving estimation pattern coincides with a moving context specified by acceleration information which is measured while the user is newly moving.

BRIEF DESCRIPTION OF THE DRAWINGS

FIG. 2 is a schematic diagram of table contents of a moving pattern storage unit in FIG. 1.

FIG. 3 is a schematic diagram of table contents of a context tag rule storage unit in FIG. 1.

FIG. 11 is one example of information extracted by the moving pattern setting unit.

DETAILED DESCRIPTION OF THE EMBODIMENTS

Figure 1:
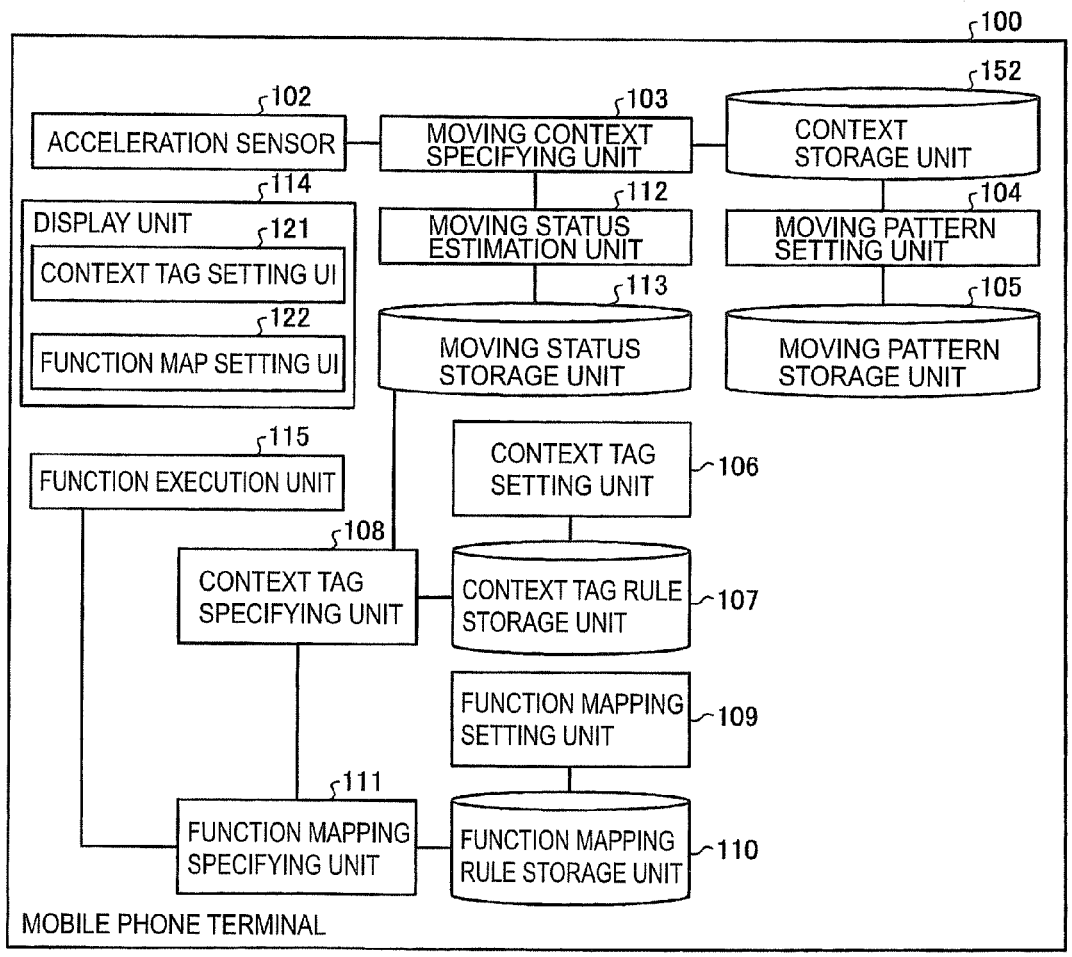
FIG. 1 is a block diagram of a mobile phone terminal according to a first embodiment.

Hereinafter, embodiments of the present invention will be explained by referring to the drawings. The present invention is not limited to the following embodiments.

The information processing apparatus, a method and a program thereof, can be applied to various apparatuses such as a PDA, except for the mobile phone terminal. Furthermore, the apparatus, the method and the program, may be applied to a device such as a PC or a server communicated with another device having the acceleration sensor.

(The First Embodiment)

FIG. 1 is a block diagram of the mobile phone terminal 100 according to the first embodiment. As shown in FIG. 1, the mobile phone terminal 100 includes a context storage unit 152, an acceleration sensor 102, a moving context specifying unit 103, a moving pattern setting unit 104, a moving pattern storage unit 105, a context tag setting unit 106, a context tag rule storage unit 107, a context tag specifying unit 108, a function mapping setting unit 109, a function mapping rule storage unit 110, a function mapping specifying unit 111, a moving status estimation unit 112, a moving status storage unit 113, a display unit 114, and a function execution unit 115.

The context storage unit stores a moving context specified by the moving context specifying unit 103 in time series. Concretely, the context storage unit 152 stores the moving context, a start time and a completion time of each moving context in time series.

The moving context represents a user's moving status, which is information to specify a moving means of the user carrying the mobile phone terminal 100. As the moving context stored in the context storage unit 152, information identifying "walking", "running", "riding" on a vehicle such as a bus or a train, and "stillness", are used.

The acceleration sensor 102 measures an acceleration of the mobile phone terminal 100. The user carries the mobile phone terminal 100. Accordingly, acceleration data of the user can be measured by the acceleration sensor while the user is moving. In the first embodiment, as the acceleration data, acceleration along three axes (XYZ) is respectively acquired.

The moving context specifying unit 103 specifies the user' moving context and a moving time of the moving context, based on the acceleration data measured by the acceleration sensor 102. In the first embodiment, as the moving context, four kinds of moving means, i.e., "walking", "running", "riding" on the vehicle, and "stillness", are specified.

Furthermore, the moving context specifying unit 103 specifies the user's next moving means from the user's previous moving means, based on the acceleration data and a transition probability among four kinds of moving means. This detail processing is explained afterwards. The moving context specified by the moving context specifying unit 103 is stored in the context storage unit 152.

The moving pattern setting unit 104 sets a moving pattern of the user from a moving start time to an arrival time to a destination, based on a moving time of each moving context stored in time series in the context storage unit 152, and stores the moving pattern into the moving pattern storage unit 105. As to the moving context included in the moving pattern (set by the moving pattern setting unit 104), two kinds of moving contexts, i.e., "walking or running" and "riding", are used by grouping above-mentioned four kinds of moving contexts. Furthermore, start time of the moving pattern is regarded as timing when the user goes from a house or a place of employment. Accordingly, the first moving context of the moving pattern is "walking or running".

As a method for recognizing a destination in the moving pattern, for example, the user may be decided to arrive the destination when the user's stillness status is longer than a predetermined period. Alternatively, when the user operates arrival to the destination into the mobile phone terminal 100, the user may be decided to arrive at the destination.

The moving pattern (set by the moving pattern setting unit 104) is set in correspondence with whether a day of the user's moving is weekday or holiday, and start time of the user's moving. If the day of the user's moving is weekday, a day of the week of the user's moving may be corresponded. In the first embodiment, "weekday or holiday", "start time of moving", and "average time sequence", are set in correspondence with the moving pattern. This moving pattern is stored in the moving pattern storage unit 105.

As shown in FIG. 2, the moving pattern storage unit 105 correspondingly stores a pattern ID, a weekday/holiday, a day of the week, a start time, and a time sequence.

The pattern ID is a unique number assigned to each moving pattern. The weekday/holiday represents that the moving pattern is performed in weekday or holiday. In case of weekday, the day of the week is stored. The start time is average time when the user begins to move along the moving pattern.

The time sequence includes an average moving time (moving period) of each moving context ("walking or running" and "riding"). In the first embodiment, the first moving context is "walking or running". After that, two kinds of moving contexts are mutually set without "stillness". In the time sequence of the first embodiment, by recording the average moving time of each moving context in time series, either of two kinds of moving contexts can be specified. Accordingly, the moving context is not recorded in the time sequence.

For example, as to the time sequence "15-10-5" in FIG. 2, the moving context and the moving time comprise "walking" of fifteen minutes, "riding" of ten minutes, and "walking" of five minutes.

This moving pattern is used for two purposes. First, it is used to detect the moving pattern along which the user is performing in real time. Second, by presenting the moving pattern to the user, the user can assign a context tag to the moving context included in the moving pattern.

As to the moving patter or the moving context in the moving pattern, the context tag setting unit 106 sets a life context tag. Furthermore, the context tag setting unit 106 can set the life context tag to a time before a start time of the moving pattern, or a time after a completion time of the moving pattern.

The life context tag is a property tag representing the user's status or what to do. The life context tag can set by a context tag setting UI 121. As the life context tag, for example, various behaviors such as "a place where the user exists", "commuting", "working", or "going home" are used. Furthermore, as the user's behavior to do during moving, for example, "post" (the user must post a mail) is used.

In the first embodiment, based on operation from the context tag setting UI 121, the context tag setting unit 106 sets the life context tag. When the moving context specifying unit 103 specifies the moving context by acceleration from the acceleration sensor 102, the life context tag set to the moving context is also specified. Accordingly, as to the mobile phone terminal 100, a status representing a place where the user exists or the user's behavior to do is specified. By mapping a predetermined function to the life context tag, the mobile phone terminal 100 can be controlled, for example, automatically activated based on the user's status. Furthermore, the present place where the user exists can be located without GPS. As a result, processing based on the user's present place can be executed.

The context tag rule storage unit 107 stores rules to specify the life context tag (set by the context tag setting unit 106). As shown in FIG. 3, the context tag rule storage unit 107 correspondingly stores a property, a tag name, a pattern ID, a time sequence number, and an additional condition.

The property represents a type of the life context tag. In the first embodiment, as the property, "status" or "ToDo" is set. The tag name represents a label of the life context tag. The pattern Id represents a number to identify the moving pattern. The time sequence number represents a number of moving time in the moving pattern. By the time sequence number, the moving context to which the life context tag is set can be specified. For example, as to the time sequence "10-20-5-15-10-30-10" and the time sequence number "3", the life context tag is already set to the third moving time "5" in this time sequence. As to each moving time in the moving pattern, the moving context "walking or running" is first set, and after this, two moving contexts "riding" and "walking or running" are mutually set. Accordingly, the moving context of the third moving time is recognized as "walking or running". As the time sequence number, a plurality of numbers, or all numbers in the time sequence, may be indicated.

The additional condition represents an additional note to specify the life context tag. The additional condition settable is explained. First, the life context tag is set to a predetermined part in the time sequence or the moving context. The predetermined part is, for example, the beginning "n" minutes, the last "n" minutes, or "m" minutes after "n" minutes has elapsed.

Second, the life context tag is assigned to a time not included in the moving pattern but based on the moving pattern, for example, a time before a start time of the moving pattern, a time after a completion time of the moving pattern, or a time between a completion time of the moving pattern and a start time of another moving pattern. This additional condition is used by the context tag specifying unit 108.

The function mapping setting unit 109 sets a function to the life context tag, which is to be executed in the mobile phone terminal 100. In the first embodiment, based on the user's operation from the function map setting UI 122, the function mapping setting unit 109 sets a function of the mobile phone terminal 100 to the life context tag. Accordingly, the function is presented based on a moving status of the user carrying the mobile phone terminal 100.

Figures 4, 5:
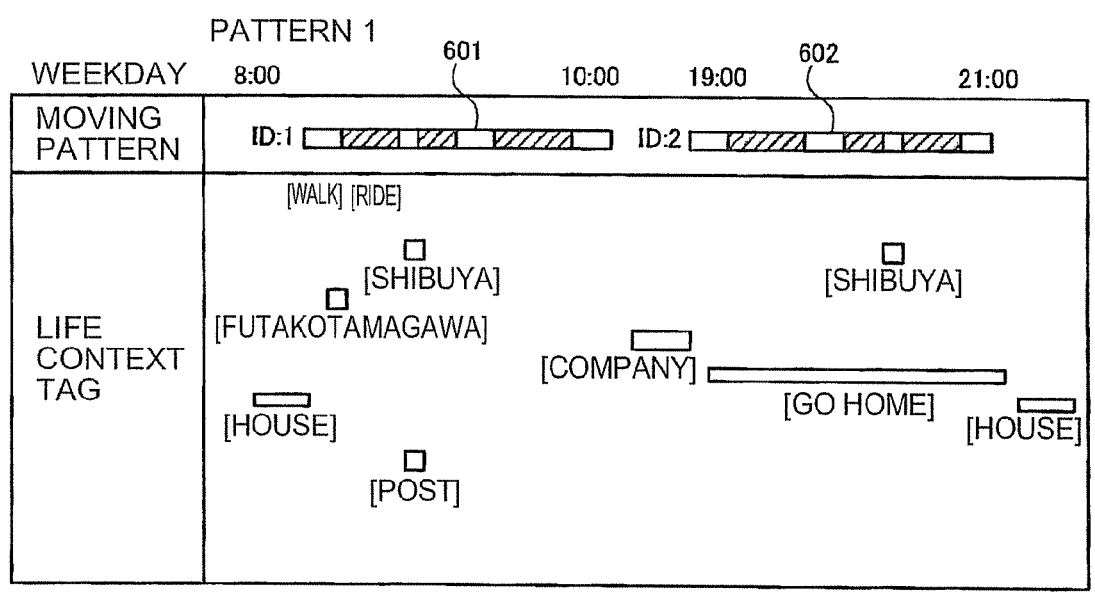
FIG. 4 is a schematic diagram of table contents of a function mapping rule storage unit in FIG. 1.
FIG. 5 is one example of a screen displayed by a context tag setting UI.

The function mapping rule storage unit 110 stores rules to specify functions set by the function mapping setting unit 109. As shown in FIG. 4, the function mapping rule storage unit 110 correspondingly stores the life context tag and the function. Accordingly, the function corresponding to the life context tag is specified.

The display unit 114 equips a context tag setting UI 121 and a function map setting UI 122, and executes display processing for a liquid crystal display (not shown) of the mobile phone terminal 100.

The context tag setting UI 121 displays an interface to add the life context tag to the moving pattern on the liquid crystal display. When the user adds the life context tag to the moving context in the moving pattern via the context tag setting UI 121, the user's status at a certain place (represented by the life context tag) is set along a moving path (represented by the moving pattern).

The context tag setting UI 121 displays a set screen corresponding to each moving pattern. However, as to a plurality of moving patterns having the same weekday/holiday condition (or the same day of the week) and different start time, the context tag setting UI 121 may display the plurality of moving patterns on the same screen.

As shown in FIG. 5, the context tag setting UI 121 displays the moving pattern and the life context tag in correspondence with passage of time. In a setting screen of FIG. 5, the moving patterns of pattern IDs "1" and "2" in FIG. 2 are displayed. At the upper part on the setting screen, a time line representing time is displayed. At a lower part from the upper part, a time line representing the moving pattern is displayed. In the setting screen of FIG. 5, the moving pattern and the life context tag of weekday are displayed.

The time line 601 located at 8:30~10:10 corresponds to the moving pattern of pattern IN "1" in FIG. 2. In the time line 601, two moving contexts ("walking", "riding") are mutually appeared in order of moving time (10, 20, 5, 15, 10, 30, 10 minutes) As to these moving contexts, the context tag setting unit 106 automatically assigns [walking] (life context tag representing the user's walking or running), or [riding] (life context tag representing the user's riding on a vehicle).

By referring to the time line displayed on the setting screen, the user can understand the moving pattern recognized by the mobile phone terminal 100, and adds the life context tag to the moving pattern displayed on the setting screen. In FIG. 5, [SHIBUYA], [FUTAKOTAMAGAWA], [COMPANY], [GO HOME], [HOUSE], and [POST], are life context tags set by the user.

Any method may be used as a method for setting the life context tag. In the first embodiment, on the time line representing the moving pattern, the user sets a range to add the tag by a direction key and a decision button of the mobile phone terminal 100, and inputs a tag name by a dial button. Furthermore, in order to assist the user to add the tag, the context tag setting UI 121 may display the date when the moving pattern actually occurs, and a time line of moving contexts included in the moving pattern.

By referring to the setting screen, the user can set his/her desired life context tag to one or a plurality of time sequences of the moving pattern. For example, a place where the user exists or the user's behavior is set on a predetermined time sequence. Furthermore, processing to be executed is set on the time sequence. For example, in order for the user to post without fail, a life context tag "POST" is set on the time sequence (or the moving context set on the time sequence). Information of the life context tag is stored in the context tag rule storage unit 107 by the context tag setting unit 106.

Figures 6, 7:
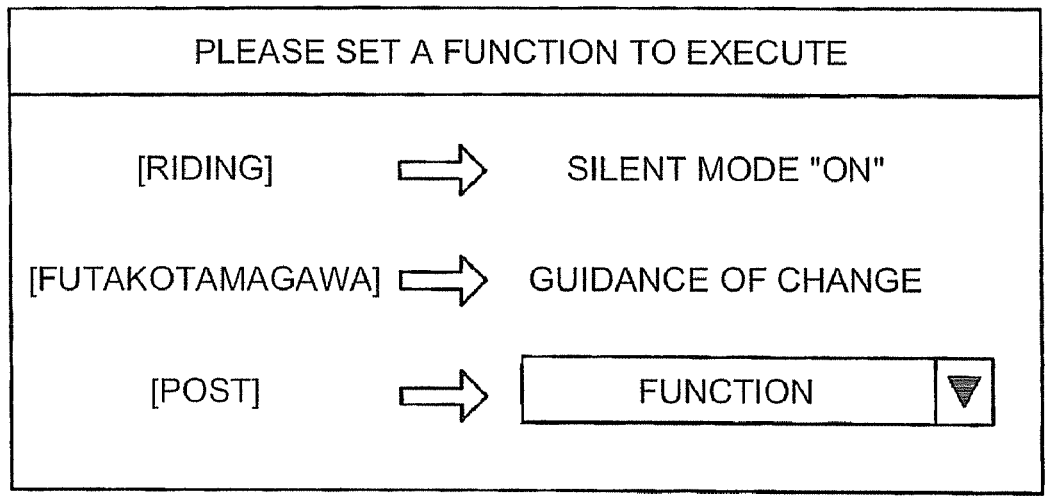
FIG. 6 is one example of a screen displayed by a function map setting UI.
FIG. 7 is a schematic diagram of table contents of a moving status storage unit in FIG. 1.

The function map setting UI 122 displays an interface to set a function mapping to the life context tag (added to the moving pattern) on the liquid crystal display. As shown in FIG. 6, as to each life context tag, the function map setting UI 122 displays a screen to set the function. By referring to this screen, the user can set a function to be executed for the life context tag. For example, as to a life context tag [riding], "silent mode ON" is corresponded as a function to be executed.

As to a plurality of life context tags, a function to be executed may be set. For example, as to two life context tags [GO HOME] and [SHIBUYA], the function "presentation of information of taverns around Shibuya" may be corresponded. In this case, when the user arrives at Shibuya during going home, the information of taverns around Shibuya is presented on the mobile phone terminal 100. In this way, one or a plurality of life context tags and the function to be executed are correspondingly stored in the function mapping rule storage unit 110 by the function mapping setting unit 109.

The moving status estimation unit 112 estimates a user's present moving status based on the moving context specified by the moving context specifying unit 103. As the user's present moving status, the moving status estimation unit 112 estimates a moving pattern and a time sequence number (a moving context specified by the time sequence number) in the moving pattern.

Briefly, when the moving context specifying unit 103 specifies a moving time of each moving context during the user's present moving, the moving status estimation unit 112 selects a moving pattern having the moving time of each moving context from moving patterns stored in the moving pattern storage unit 105, and estimates the selected moving pattern as the user's present moving pattern. The moving status estimation unit 112 updates the moving status storage unit 113 based on the estimated present status.

The moving status storage unit 113 stores the user's present status in correspondence with each moving pattern selected. As shown in FIG. 7, the moving status storage unit 113 stores a pattern ID, a status, and a time sequence number in correspondence with each moving pattern. Based on the user's present moving status (estimated by the moving status estimation unit 112), the status is updated in order of "BEFORE PATTERN", "INTER-PATTERN", and "AFTER PATTERN". Furthermore, while the status is "INTER-PATTERN", the time sequence number is updated to match with a time sequence of the moving pattern.

The pattern ID represents an ID to identify the moving pattern is set. The status represents that the user's present status is temporally before the moving pattern, during the moving pattern, or after the moving status. The time sequence number represents a moving context (which time sequence) in the moving pattern matched with the user's present status.

By referring to the moving status storage unit 113, the context tag specifying unit 108 specifies a life context tag matched with the user's present moving status. The life context tag specified is not limited to one, and a plurality of life context tags may be specified. In the first embodiment, if a condition of the life context tag stored in the context tag rule storage unit 107 coincides with the moving pattern (the pattern ID, the status, the time sequence number) stored in the moving status storage unit 113, the context tag specifying unit 108 specifies a life context tag corresponding to the condition.

For example, if a pattern ID and a time sequence number stored in the context tag rule storage unit 107 coincide with a pattern ID and a time sequence number stored in the moving status storage unit 113, a tag name corresponding to the pattern ID and the time sequence number is specified as the life context tag. Naturally, the context tag specifying unit 108 specifies the life context tag by using the additional condition stored in the context tag rule storage unit 107. Accordingly, the context tag specifying unit 108 acquires time information from a timer (not shown in FIG. 1).

By referring to the function mapping rule storage unit 110, the function mapping specifying unit 111 specifies a function corresponding to one or a plurality of life context tags specified by the context tag specifying unit 108.

The function execution unit 115 executes the function specified by the function mapping specifying unit 111. As a result, according to acceleration from the acceleration sensor 102, the function corresponding to the life context tag coincided with the moving context and the moving pattern (estimated by the moving status estimation unit 112) is executed.

Figure 8:
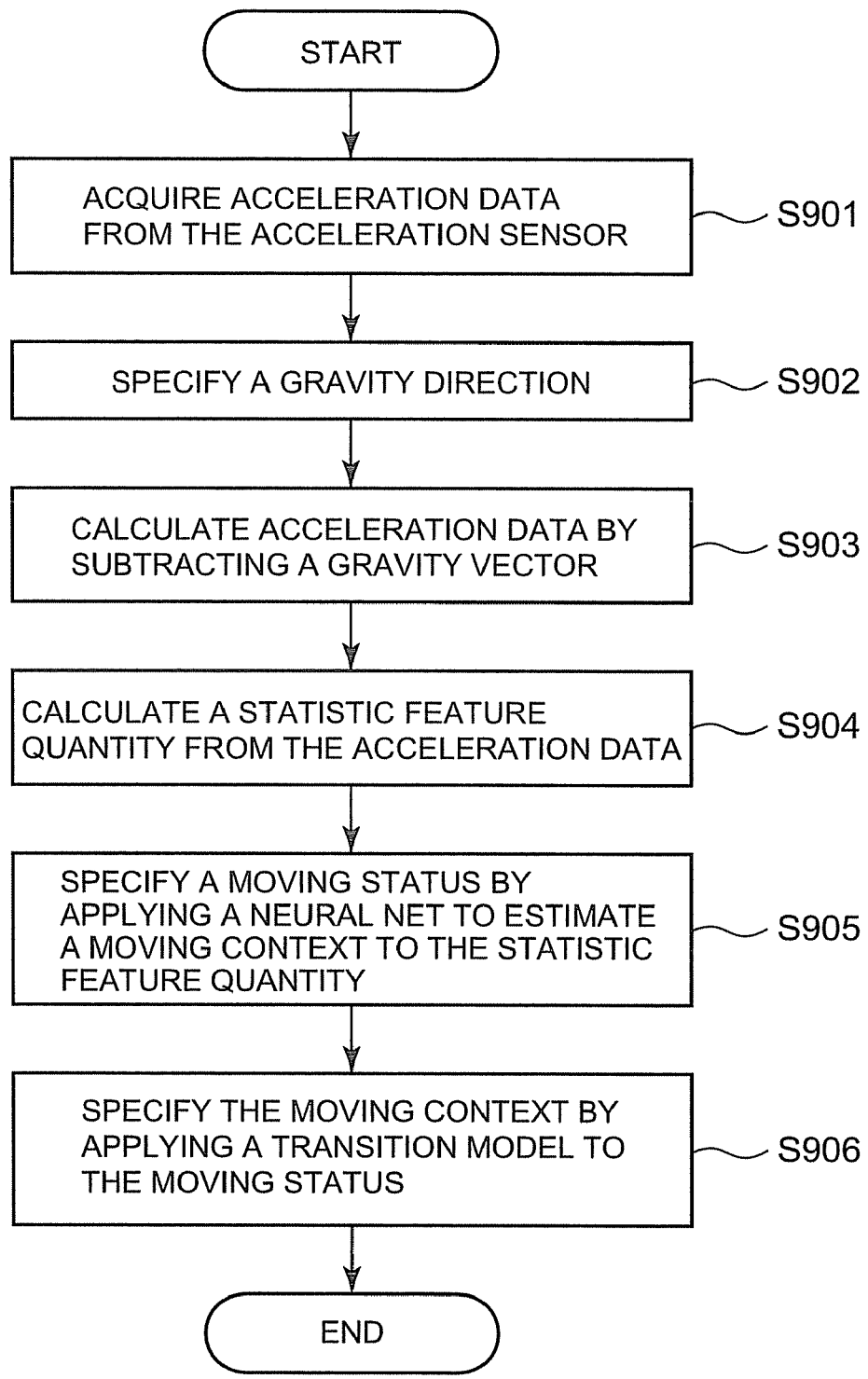
FIG. 8 is a flow chart of processing of a moving context specifying unit in FIG. 1.

Next, processing steps to specify the moving context by moving context specifying unit 103 in the mobile phone terminal 100 is explained by referring to FIG. 8. First, the moving context specifying unit 103 acquires acceleration data from the acceleration sensor 102 (S901). As the acceleration data, the acceleration along three axes (XYZ) is respectively acquired.

Next, the moving context specifying unit 103 estimates a gravity direction from the acceleration data (S902). Concretely, an average of the acceleration data in a predetermined period is calculated as a three-dimensional vector, and the three-dimensional vector is normalized so that a scalar of the three-dimensional vector is 1 G. After that, the moving context specifying unit 103 subtracts the gravity vector from the acceleration data, and calculates acceleration data excluding a gravity component (S903).

Next, the moving context specifying unit 103 calculates three feature quantities, i.e., a length of the acceleration data, an inner product between the acceleration data and the gravity vector, and an outer product between the acceleration data and the gravity vector. After that, the moving context specifying unit 103 calculates a statistic feature quantity from the three feature quantities (S904). The three feature quantities are not affected even if the mobile phone terminal 100 (having the acceleration sensor) turns to any direction. Accordingly, no matter how the user carries the mobile phone terminal 100, the three feature quantities can be used to specify the user's moving context.

The statistic feature quantity is a maximum, a minimum, an average, and a distribution of three feature quantities. By calculating these four values from each feature quantity, twelve-dimensional values are acquired. This statistic feature quantity is used as a feature quantity having temporal transition of the acceleration.

Next, as to the twelve-dimensional values, the moving context specifying unit 103 applies a neural net to estimate a moving context, and estimates the user's moving status, i.e., "walking", "running", "riding", or "stillness" (S905). The neural net to estimate a moving context is trained by giving the statistic feature quantity (a correct answer) of each status (previously acquired). Furthermore, these four statuses are respectively represented as a value from "0" to "1". The larger the value is, the higher a degree to estimate as the status is. In the present embodiment, the user's moving status is decided as one of the four statuses. However, the number of statuses except for four may be used.

Next, as to the four statuses, the moving context specifying unit 103 applies a temporal transition model to eliminate a noise, and specifies a moving context (S906). The transition model represents a degree to transfer from each status to another status. For example, in case of transferring from "riding" to "stillness", it often happens that a bus or a train stops temporally. Accordingly, a heuristic to maintain "riding" is realized.

Figures 9, 10:
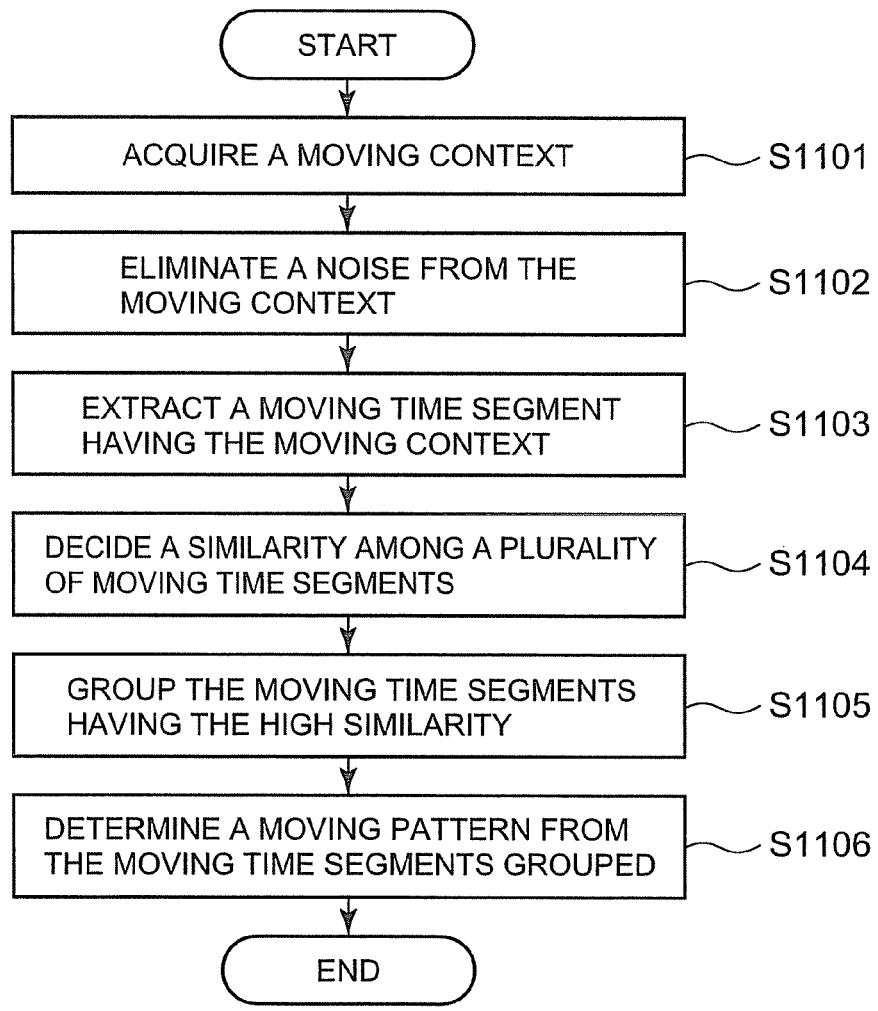
FIG. 9 is a schematic diagram of a transition model representing a transition possibility from each moving status to another moving status.
FIG. 10 is a flow chart of processing of a moving pattern setting unit in FIG. 1.

As to the transition model in FIG. 9, a degree to transfer from each status to another status is represented as a value "0-1". The larger the value is, the higher the degree to transfer from a transition source to a transition destination is. An average of each status at some timing in the past (within a predetermined period) is regarded as the transition source. As to four statuses decided from the acceleration sensor 102, by adjusting each value using the degree of the transition model, a status of the transition destination is calculated. In this way, the moving context is specified. The specified moving context is stored in the context storage unit 152. Furthermore, by referring to the moving context stored in the context storage unit 152, the moving pattern setting unit 104 sets a moving pattern.

Next, processing steps to set the moving pattern by the moving pattern setting unit 104 is explained by referring to FIG. 10. The moving pattern setting unit 104 sets daily changes of the moving context and a typical time sequence of the moving context of the user as the moving pattern. As explained below, in the user's daily life, by deciding a similarity among moving times of the user's going to the office, moving times of the user's leaving the office, and the user's traffic means, the moving pattern is set.

First, the moving pattern setting unit 104 acquires the moving context in time series from the context storage unit 152 (S1101). Next, the moving pattern setting unit 104 eliminates a noise from the moving context acquired in time series (S1102) In the flow chart of FIG. 8, the noise is eliminated to some extent by applying the transition model. However, the moving pattern needs rougher time sequence data, and the noise elimination is further executed.

Any method may be used as the noise elimination means. For example, a moving context appeared in a very short time is over-written by another moving context adjacent to the moving context. Concretely, the moving context "stillness" appeared between moving contexts "riding" is over-written by the moving context "riding". As a result, a time segment of moving context "walking or running" and a time segment of moving context "riding" occur mutually. These time segments are called a moving time segment.

After that, the moving pattern setting unit 104 extracts the moving time segment having the moving context (S1103) As an example of the moving time segment, a time segment of the user's going to the office, a time segment of the user's leaving the office, or a time segment of the user's official trip, are applied. In the first embodiment, if the moving context "riding" appears following the first moving context "walking", a start time of "walking" is set as the start time of the moving time segment. A time segment from this start time to a start time of "stillness" later appeared for a long time is extracted as the moving time segment.

As shown in FIG. 11, the moving pattern setting unit 104 extracts the start time and the time sequence of each moving time segment in each day. In FIG. 11, the date represents a date which the user's moving was performed. The start time represents a time which the user's moving has started. The time sequence represents the moving time of each moving context from the start time.

In this processing steps, four kinds of moving contexts are redefined as two kinds of moving contexts. The two kinds of moving contexts in the moving time segment are "walking or running" and "riding (on a vehicle)". In this case, "stillness" during the user's moving is included in the two kinds of moving contexts. In the time sequence, the first moving context is "walking or running", and the moving times of "walking or running" and "riding (on a vehicle)" are mutually set. Accordingly, the moving context and the moving time (comprising the time sequence) are specified. By extracting the moving time segment shown in FIG. 11, moving contexts from the user's moving start to the user's arrival to a destination are specified.

For example, the moving time segment 1201 in FIG. 11 is a time segment which the user's moving started from 8:15 in January 15. After the moving started, "walking or running" is performed in ten minutes, "riding on a vehicle" is performed in twenty minutes, "walking or running" is performed in five minutes, "riding on a vehicle" is performed in fifteen minutes, "walking or running" is performed in ten minutes, "riding on a vehicle" is performed in thirty minutes, "walking or running" is performed in ten minutes, and the user arrives the destination. In this case, a time segment of "walking or running" may include "stillness" having an arbitrary length.

Next, as to a plurality of moving time segments, the moving pattern setting unit 104 decides a similarity (S1104). In the first embodiment, the similarity among the plurality of moving time segments is calculated by following condition.

1) As to two moving time segments having the same length of entire time sequence, time lengths of two moving times having the same moving context in the two moving time segments are similar (above a threshold).
2) Both the two moving time segments are weekday or holiday.
3) Both the two moving time segments are the same day of the week.
4) A difference of start times of the two moving time segments is below a predetermined threshold.

Based on above four conditions, the moving pattern setting unit 104 calculates the similarity among the plurality of moving time segments. The larger a coincidence degree of above four conditions is, the higher the similarity is.

After calculating the similarity of each combination of two moving time segments in all moving time segments within a predetermined period, the moving pattern setting unit 104 groups a plurality of moving time segments having the similarity above the threshold (S1105). Then the moving pattern setting unit 104 sets the grouped moving pattern segments having the number of moving time segments above a fixed number as a moving pattern (S1106).

In the first embodiment, by calculating an average of the grouped moving pattern segments, a start time and a time sequence of the moving pattern is generated, and stored in the moving pattern storage unit 105. For example, pattern IDs "1" and "2" in FIG. 2 represent moving patterns generated from moving time segments of "1/15" while the user is going to the office and leaving the office on weekday.

Figure 12:
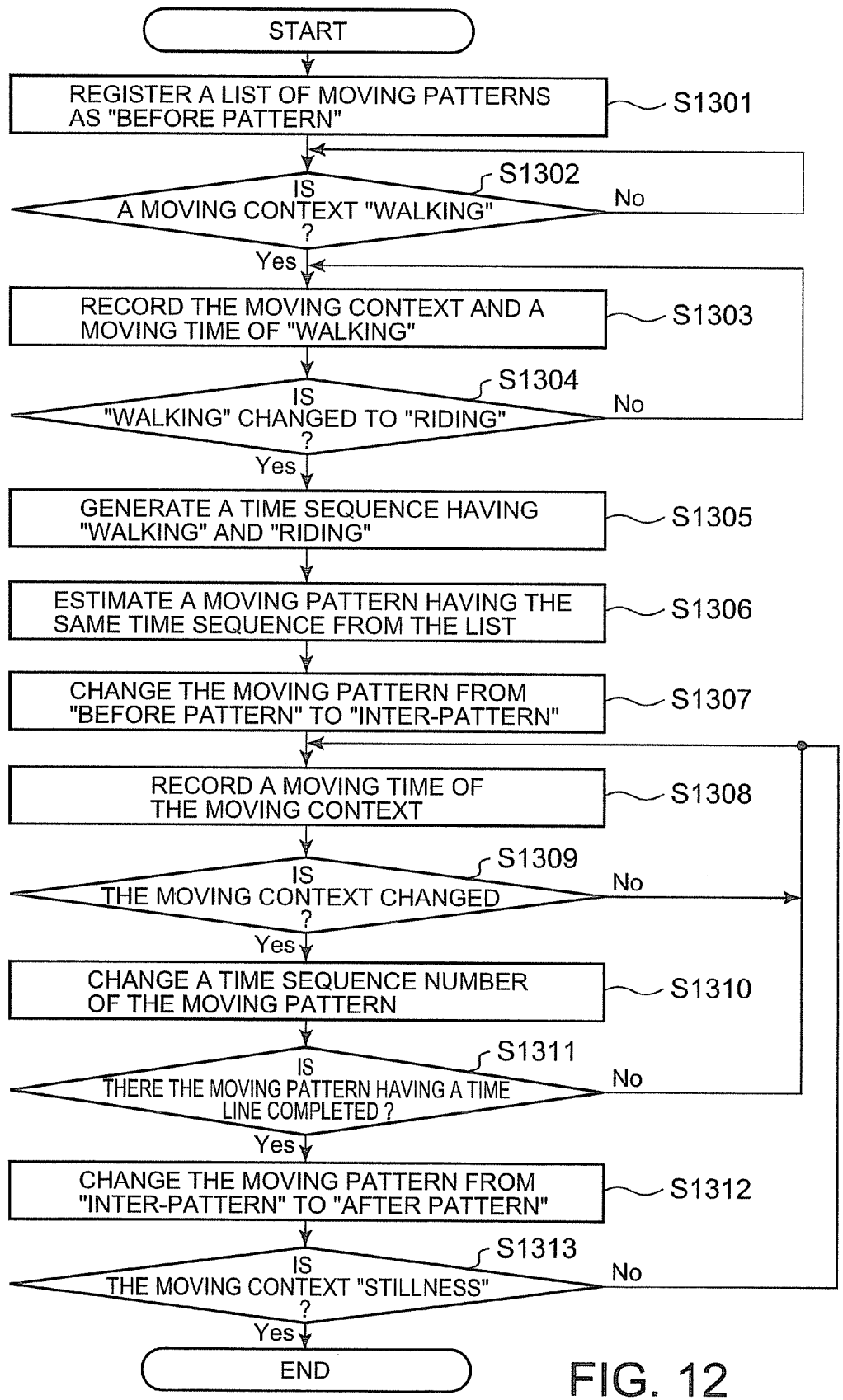
FIG. 12 is a flowchart of processing of a moving status estimation unit in FIG. 1.

Next, update processing of moving status in the mobile phone terminal 100 of FIG. 1 is explained by referring to FIG. 12. In the update processing, based on the moving pattern storage unit 105, a moving pattern along which the user is moving at present is specified from a moving context specified in real time, and a moving status is specified by the moving pattern.

First, the moving status estimation unit 112 estimates (selects) a moving pattern matched with the present date and time (weekday/holiday, a date of the week, a start time) from moving patterns stored in the moving pattern storage unit 105. Furthermore, based on the moving pattern estimated, the moving status estimation unit 112 registers a list of moving patterns having a status "BEFORE PATTERN" (representing a period before the user is moving) into the moving status storage unit 113 (S1301).

Next, the moving context specifying unit 103 decides whether the user begins to move (walk or run) by acceleration from the acceleration sensor 102 (S1302). When the user does not begin to move (No at S1302), the moving context specifying unit 103 repeatedly decides whether the user begins to move at a predetermined interval until the user begins to move.

Next, when the user begins to move (Yes at S1302), the moving context specifying unit 103 records a moving time of the moving context (the user is walking or running continually) (S1303). In this case, even if a stillness status occurs during the user's moving, the moving context specifying unit 103 may record a period from the moving start time to an occurrence time of "riding (on a vehicle)" as a moving time of "walking" or "running".

Next, the moving context specifying unit 103 decides whether the moving context changes to "riding" (S1304). When the moving context does not change (No at S1304), the moving context specifying unit 103 records a moving time of the moving context (the user is walking or running continually) (S1303). When the moving context changes to "riding" (Yes at S1304), the moving context specifying unit 103 generates a time sequence starting from the moving time of "walking" or "running" (S1305).

Next, the moving status estimation unit 112 estimates (selects) a moving pattern having a status "BEFORE PATTERN" and the same time sequence from a start time, from moving patterns registered in the moving status storage unit 113 (S1306). Then, the moving status estimation unit 112 updates a status of the selected moving pattern from "BEFORE PATTERN" to "INTER-PATTERN" in the moving status storage unit 113 (S1307). In this case, the moving status estimation unit 112 sets a time sequence number "1" of the selected moving pattern.

Next, the moving context specifying unit 103 continually records a moving time of the moving context (S1308). After that, the moving context specifying unit 103 decides whether the moving context changes by acceleration from the acceleration sensor 102 (S1309). When the moving context does not change (No at S1309), the moving context specifying unit continually records the moving time of the moving context (S1308).

When the moving context changes (from "riding" to "walking or running") (Yes at S1309), the moving status estimation unit 112 changes the time sequence number of the moving pattern in the moving status storage unit 113 (S1310). In this case, by referring to a present time sequence number of the moving pattern having the status "INTER-PATTERN", if a moving time of the present time sequence number is equal to a recorded moving time of the moving context, the time sequence number is incremented by "1". Furthermore, if the moving time of the present time sequence number is not equal to the recorded moving time of the moving context, a status of the moving pattern is returned to "BEFORE STATUS" because this moving pattern does not match with the user's present moving.

Next, the moving status estimation unit 112 decides whether a moving pattern having a time line completed exists in the moving status storage unit 113 (S1311). Concretely, the moving status estimation unit 112 decides whether the present time sequence number is above a length of the time sequence of the moving pattern. If the present time sequence number is above the length of the time sequence, the moving status estimation unit 112 decides this moving pattern as the time sequence completed.

When the moving pattern having the time line completed does not exist (No at S1311), the moving status estimation unit 112 continually records the moving time of the moving context changed (S1308).

On the other hand, when the moving pattern having the time line completed exists (Yes at S1311), the moving status estimation unit 112 changes a status of the moving pattern from "INTER-PATTERN" to "AFTER PATTERN" in the moving status storage unit 113 (S1312).

Next, the moving context specifying unit 103 decides whether the user stops moving in a predetermined period by acceleration from the acceleration sensor 102 (S1313). If the user does not stop moving (No at S1313), processing is repeated from S1308. On the other hand, if the user stops moving (Yes at S1313), processing is completed because user's moving is completed. By above-mentioned processing steps, the status and the time sequence number in the moving status storage unit 113 are updated based on the user's moving status.

Figure 13:
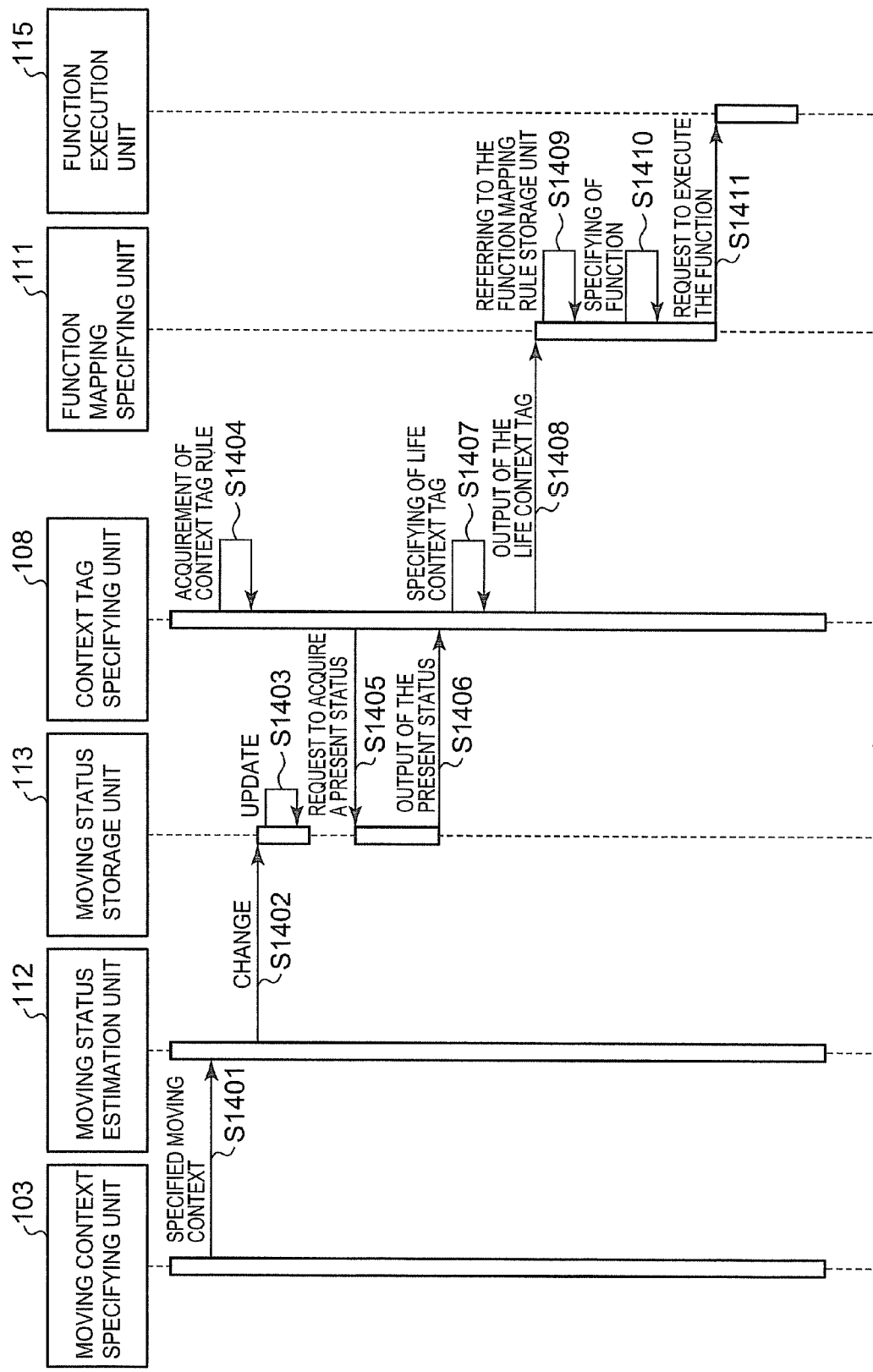
FIG. 13 is a sequence chart to execute a function of the mobile phone terminal.

Next, processing of the mobile phone terminal 100, to specify a life context tag based on change of the moving context and execute a function corresponding to the context tag, is explained by referring to FIG. 13. First, the moving context specifying unit 103 outputs a moving context (specified by acceleration from the acceleration sensor 102) and a moving time of the moving context to the moving status storage unit 112 (S1401).

Next, based on the moving context and the moving time, the moving status estimation unit 112 changes contents of the moving status storage unit 113 (S1402). Briefly, the moving status storage unit 113 is updated by the user's present status (S1403). Detail processing of S1401~S1403 is the same as explanation of FIG. 12. On the other hand, the context tag specifying unit 108 acquires a context tag rule stored in the context tag rule storage unit 107 (S1404).

Next, the context tag specifying unit 108 requests the moving status storage unit 113 to acquire the user's present moving status (a status and a time sequence number of each moving pattern) (S1405). Accordingly, the user's present moving status is output to the context tag specifying unit 108 (S1406). Then, the context tag specifying unit 108 specifies a life context tag matched with the user's present moving status (S1407).

Next, the context tag specifying unit 108 outputs the life context tag (specified) to the function mapping specifying unit 111 (S1408). After that, by referring to the function mapping rule storage unit 110 (S1409), the function mapping specifying unit 111 specifies a function corresponding to the life context tag (S1410). Then, the function mapping specifying unit 111 requests the function execution unit 115 to execute the specified function (S1411). By above-mentioned processing steps, the function corresponding to the user's moving status is executed.

Figure 14:
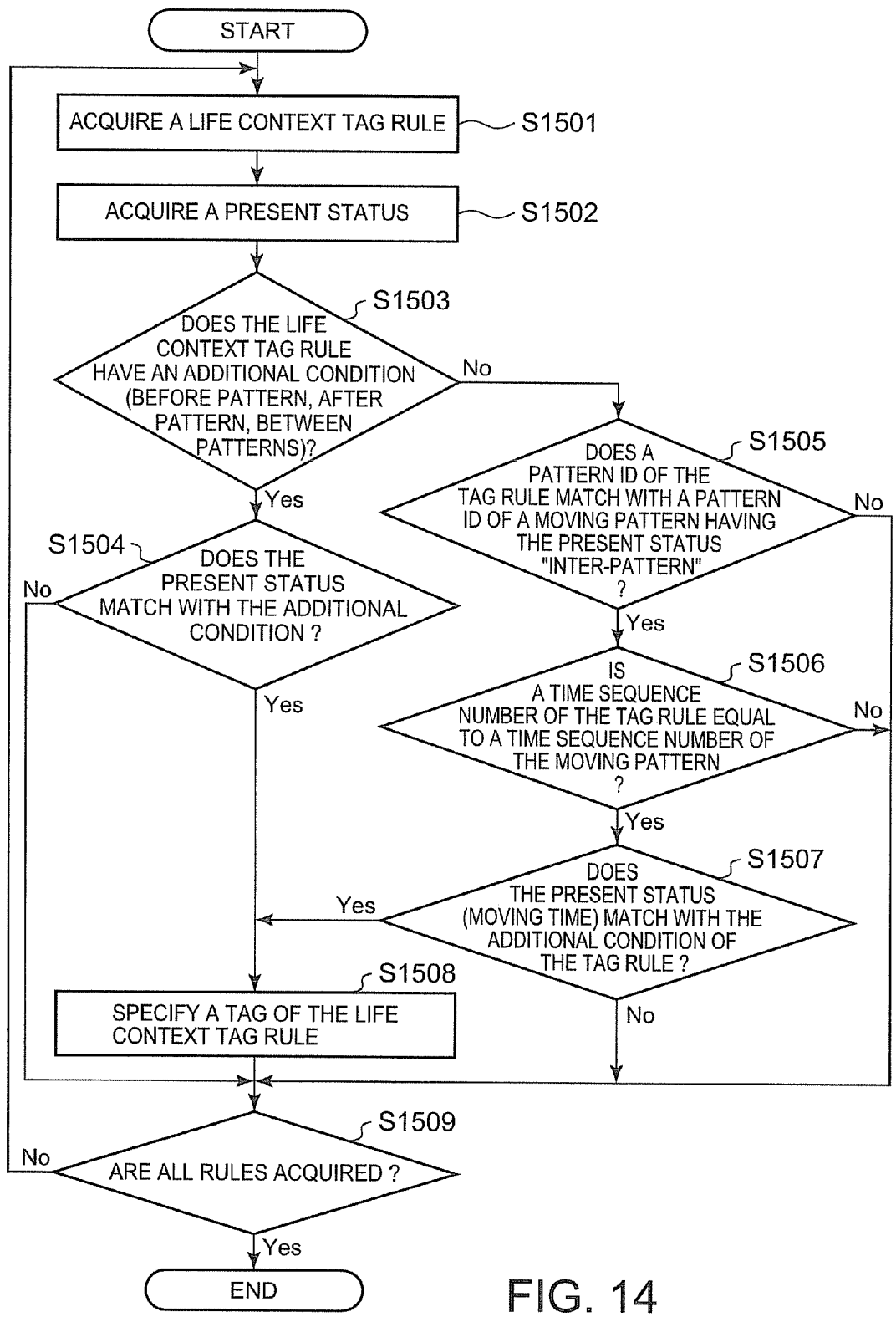
FIG. 14 is a flow chart of processing of a context tag specifying unit in FIG. 1.

Next, processing steps to specify the life context tag by the context tag specifying unit 108 is explained by referring to FIG. 14. Processing steps of FIG. 14 are detail processing of S1404~S1407 of FIG. 13. First, the context tag specifying unit 108 acquires a life context tag rule from the context tag rule storage unit 107 (S1501). Next, the context tag specifying unit 108 requests the moving status storage unit 113 to acquire the user's present moving status (a time sequence number, a status and a present moving time of each moving pattern), and acquires the user's present moving status (S1502). Then, the context tag specifying unit 108 decides whether the context tag rule includes an additional condition ("BEFORE PATTERN", "AFTER PATTERN", or "BETWEEN PATTERNS") (S1503).

If the context tag rule includes an additional condition ("BEFORE PATTERN", "AFTER PATTERN", or "BETWEEN PATTERNS") (Yes at S1503), the context tag specifying unit 108 decides whether the present status (For example, a status of each moving pattern) matches with the additional condition ("BEFORE PATTERN", "AFTER PATTERN", or "BETWEEN PATTERNS") of the context tag rule (S1504). If the present status does not match with the additional condition (No at S1504), special processing is not executed.

On the other hand, if the present status matches with the additional condition (Yes at S1504), the context tag specifying unit 108 specifies a life context tag from the context tag rule (S1508). Furthermore, if the context tag rule does not include the additional condition ("BEFORE PATTERN", "AFTER PATTERN", or "BETWEEN PATTERNS") (No at S1503), the context tag specifying unit 108 decides whether a pattern ID of the context tag rule matches with a pattern ID of the moving pattern having "INTER-PATTERN" as the present status (S1505). If the pattern ID of the context tag rule does not match with the pattern ID of the moving pattern (No at S1505), processing is completed.

On the other hand, if the pattern ID of the context tag rule matches with the pattern ID of the moving pattern (Yes at S1505), the context tag specifying unit 108 decides whether a time sequence number of the context tag rule is equal to a time sequence number of the pattern ID as the present status (S1506). If the time sequence number of the context tag rule is not equal to the time sequence number of the pattern ID (No at S1506), processing is forwarded to S1509.

If the time sequence number of the context tag rule is equal to the time sequence number of the pattern ID (Yes at S1506), the context tag specifying unit 108 decides whether the present status (For example, a moving time) matches with the additional condition of the context tag rule (S1507). If the present status does not match with the additional condition of the context tag rule (No at S1507), processing is completed. In this case, if the additional condition is not set, processing is forwarded to S1508 without S1507.

If the present status matches with the additional condition of the context tag rule (Yes at S1507), the context tag specifying unit 108 specifies a life context tag (tag name) of the context tag rule (S1508). After that, the context tag specifying unit 108 decides whether processing of all tag rules is completed (S1509). If processing of all tag rules is not completed yet (No at S1509), processing is forwarded to S1501. On the other hand, if processing of all tag rules are already completed (Yes at S1509), the context tag specifying unit 108 completes the processing.

Processing of FIG. 14 may be executed at any time. For example, the processing may be executed at predetermined interval, or when a status or a time sequence number of the moving pattern is changed in processing steps of FIG. 12. Execution at predetermined interval is necessary to suitably process, for example, in case of setting "before two minutes" to the additional condition.

Furthermore, if a function corresponding to a life context tag (specified) exists, the function execution unit 115 executes the function. Accordingly, for example, when the user's moving status changes to "riding", the mobile phone terminal 100 is set to "silent mode". Furthermore, when the user arrives at Futakotamagawa station, Web page for guidance of change is displayed on the mobile phone terminal 100.

As to the mobile phone terminal 100 of the first embodiment, the user's moving status is specified based on information from the acceleration sensor, and a function is executed based on the moving status specified. Accordingly, a context ware function (service presentation based on the user's status) as a high function with a low cost and a low power consumption can be realized.

Furthermore, as to the mobile phone terminal 100 of the first embodiment, the user's present location is recognized without a GPS (Global Positioning System). Accordingly, processing based on the user's present location is executed. In the prior art, when a user arrives at a predetermined station, the user's location at the station is decided by the GPS. However, the reason why the user exists at the station is not decided, for example, whether the user is returning home, or whether the user is periodically making an official trip to go the branch adjacent to the user's home.

On the other hand, as to the mobile phone terminal 100 of the first embodiment, the user's moving status is decided using moving patterns set by various conditions (the date of the week, the start time). By specifying the moving pattern matched with these various conditions, the user's destination is decided. Furthermore, by setting a tag to the moving pattern, it is decided whether the user is returning home or making the official trip. Accordingly, if the user is returning home, the purport is informed to the other party calling the user. Briefly, various services based on the moving pattern can be provided.

In the first embodiment, an example that the information processing apparatus is applied to the mobile phone terminal 100 is explained. However, application of the information processing apparatus is not limited to the mobile phone terminal. For example, as shown in a modification of FIG. 15, the information processing apparatus may comprise a mobile phone terminal 1600 and a context server 1650. In this modification, the context server 1650 prepares a function of the information processing apparatus, and the mobile phone terminal 1600 has the acceleration sensor 102. This mobile phone terminal 1600 is connected with the context server 1650 via a public network.

Figure 15:
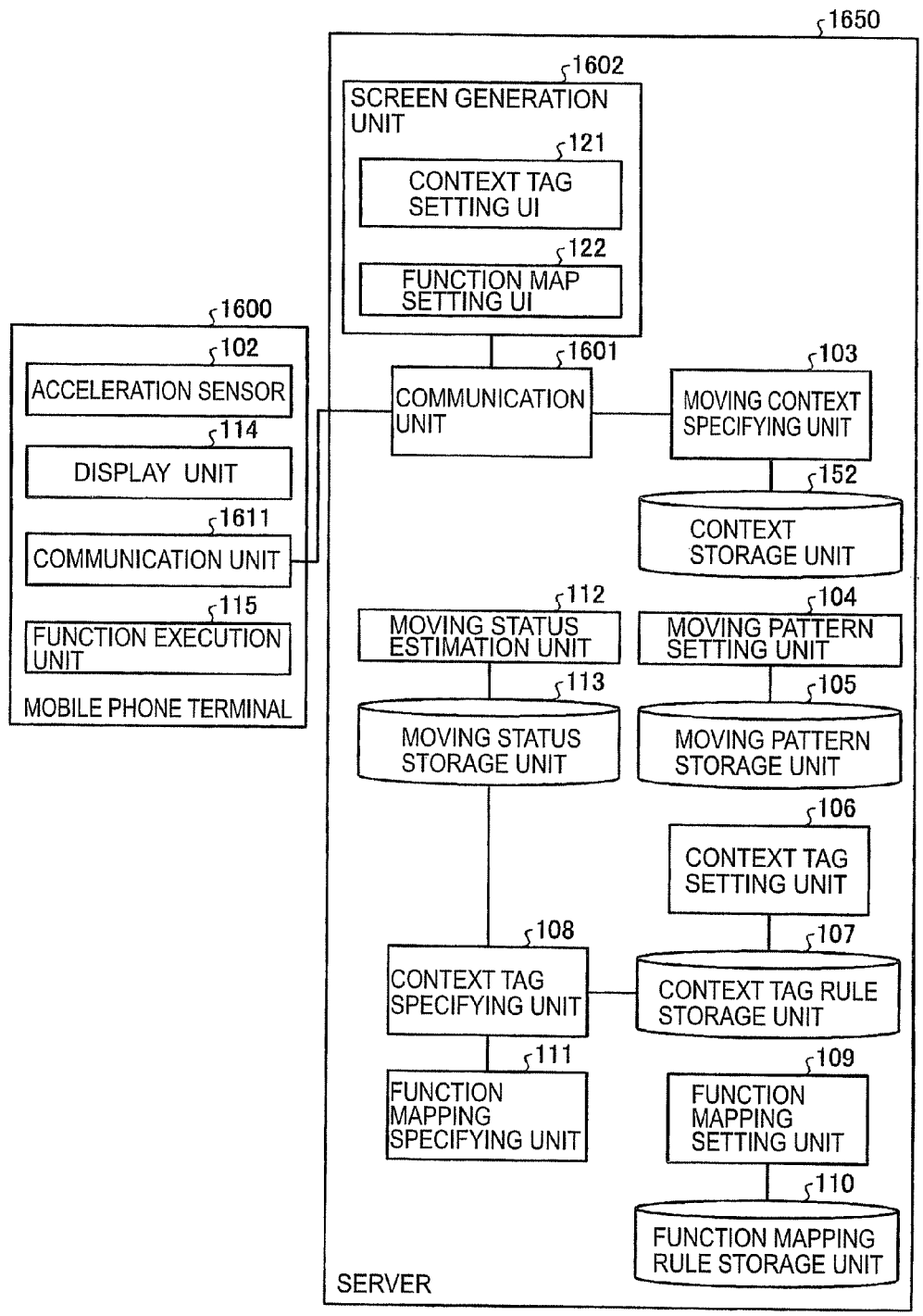
FIG. 15 is a block diagram of a mobile phone terminal and a context server according to a modification of the first embodiment.

As shown in FIG. 15, the mobile phone terminal 1600 includes the acceleration sensor 102, the display unit 114, the function execution unit 115 (each prepared by the mobile phone terminal 100 of the first embodiment), and further a communication unit 1611. The communication unit 1611 transmits/receives information with the context server 1650. Concretely, the communication unit 1611 transmits acceleration data (measured by the acceleration sensor 102) to the context server 1650.

The communication unit 1611 receives screen information from the context server 1650. Accordingly, the display unit 114 displays a screen to set a context tag and a screen to set a function map. Furthermore, the communication unit 1611 transmits operation information (input from the mobile phone terminal 1600) to the context server 1650. Then, the communication unit 1611 receives screen information based on the operation information from the context server 1650.

The context server 1650 includes the moving context specifying unit 103, the moving pattern setting unit 104, the moving pattern storage unit 105, the context tag setting unit 106, the context tag rule storage unit 107, the context tag specifying unit 108, the function mapping setting unit 109, the function mapping rule storage unit 110, the function mapping specifying unit 111, the moving status estimation unit 112, and the moving status storage unit 113 (each prepared by the mobile phone terminal 100 of the first embodiment). Furthermore, the context server 1650 includes a communication unit 1601 and a screen generation unit 1602. In the modification, as to the same unit as the first embodiment, the same sign is assigned, and the explanation is omitted.

The communication unit 1601 transmits/receives information with the mobile phone terminal 1600 or a PC (Personal Computer) not shown. By receiving information from the PC, the communication unit 1601 sets a context tag and a function mapping to the mobile phone terminal 1600, based on the operation of the PC. Briefly, these settings are operable with an input device or a display device of the PC, and the user's operability improves. Accordingly, for example, the user drags a mouse on a time line representing the moving pattern to set a life context tag. In this case, the user can operate to set a range to add the tag and input a corresponding tag name from a keyboard.

The communication unit 1601 receives acceleration data transmitted from the mobile phone terminal 1600. Furthermore, the communication unit 1601 receives operation information executed by the mobile phone terminal 1600. By receiving this operation information, the context tag and the function mapping are set.

The communication generation unit 1601 transmits screen information to the mobile phone terminal 1600. Furthermore, when a function to be executed by the function mapping specifying unit 111 is specified, the communication unit 1601 transmits a message to execute the function to the mobile phone terminal 1600.

The screen generation unit 1602 includes the context tag setting UI 121 and the function map UI 122. A screen generated by the context tag setting UI 121 and a screen generated by the function map setting UI 122 are same as those of the first embodiment. The screen information generated is transmitted to the mobile phone terminal.

By transmitting the acceleration of the acceleration sensor 102 from the mobile phone terminal 1600 to the context server 1650, the context server 1650 may execute processing based on the acceleration. Furthermore, the function of the information processing apparatus may be distributed to the mobile phone terminal and the context server respectively.

Figure 16:
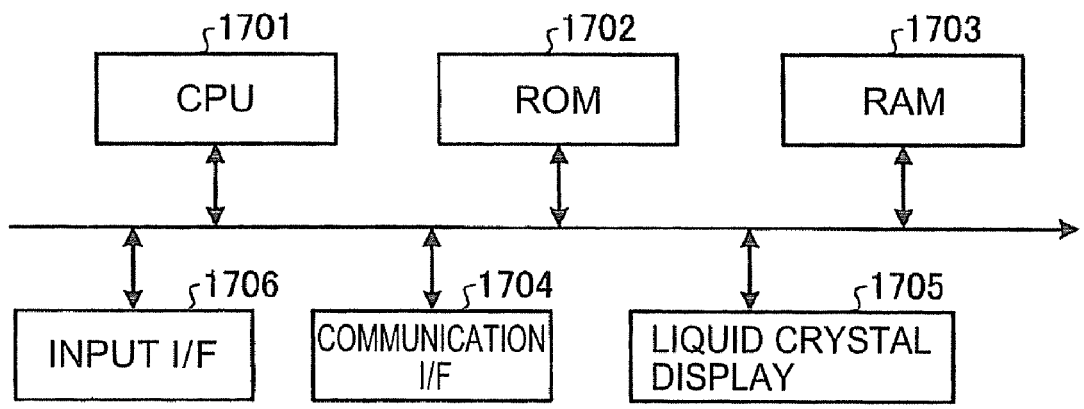
FIG. 16 is a hardware component of the mobile phone terminal.

FIG. 16 is a hardware component of the mobile phone terminal 100 of the first embodiment. As shown in FIG. 16, the mobile phone terminal 100 includes a CPU 1701, a ROM (Read Only Memory) 1702, a RAM 1703, a liquid crystal display 1705, and an input interface 1706 such as a ten key. Furthermore, the context server 1650 of the modification has the same hardware component as a PC including the CPU 1701, the ROM 1702, and the RAM 1703. Accordingly, explanation of the hardware component of the context server 1650 is omitted.

In the disclosed embodiments, the processing can be performed by a computer program stored in a computer-readable medium.

In the embodiments, the computer-readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software) such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An apparatus for processing information, comprising:
a specifying unit configured to specify a moving context and a moving time of a user by acceleration information while the user is moving, the moving context representing a moving means of the user, the acceleration information being measured by an acceleration sensor carried with the user;
a storage unit configured to store the moving context and the moving time in time series;
a pattern setting unit configured to set a time sequence of the moving context and the moving time stored in the storage unit, from a moving start time to an arrival time to a destination, as a moving pattern from the moving start time;
a tag setting unit configured to set a tag to the moving context in the moving pattern, the tag representing a place where the user exists and identifying a function to be executed at the place;
an estimation unit configured to generate a moving estimation pattern as the moving pattern having the moving context and the moving time specified by acceleration information which is measured when the user is newly moving; and
an execution unit configured to execute the function identified by the tag, when the moving context set with the tag in the moving estimation pattern coincides with a moving context specified by acceleration information which is measured while the user is newly moving.

2. The apparatus according to claim 1, wherein
the moving context is the user's walking or the user's riding on a vehicle.

3. The apparatus according to claim 1, wherein,
while the user is newly moving,
the estimation unit estimates change from the moving context to another moving context by referring to a transition probability that a plurality of moving contexts mutually transfers.

4. The apparatus according to claim 1, wherein
the pattern setting unit sets at least one of the moving start time and a day of the week when the user is moving in correspondence with the moving pattern.

5. The apparatus according to claim 1, wherein
the tag setting unit sets a tag to a time before the moving start time of the moving pattern, a time after the arrival time of the moving pattern, or a time between the arrival time of the moving pattern to the moving start time of another moving pattern.

6. The apparatus according to claim 1 or 4, wherein
the moving pattern has the moving context "walking" and the moving context "riding" mutually, and a moving time corresponding to each moving context, the moving time having a time sequence number.

7. The apparatus according to claim 6, wherein,
the user begins to move newly,
the estimation unit selects the moving pattern corresponding the moving start time and the day of the week, and sets a status of the selected moving pattern as "before pattern".

8. The apparatus according to claim 7, wherein
the estimation unit decides whether the moving time of the moving context "walking" in the selected moving pattern coincides with a moving time of the moving context "walking" measured while the user is newly moving.

9. The apparatus according to claim 8, wherein,
if the moving time of the moving context "walking" in the selected moving pattern coincides with a moving time of the moving context "walking" measured while the user is newly moving,
the estimation unit sets the selected moving pattern as the moving estimation pattern, and sets the status of the moving estimation pattern as "inter-pattern".

10. The apparatus according to claim 9, wherein,
whenever the moving context changes to another moving context while the user is newly moving,
the estimation unit updates the time sequence number of the moving time in the moving estimation pattern, and decides whether the time sequence number of the moving estimation pattern is completed.

11. The apparatus according to claim 10, wherein,
if the time sequence number of the moving estimation pattern is completed,
the estimation pattern sets the status of the moving estimation pattern as "after pattern".

12. A method for processing information, the method being executed by a computer, comprising:
specifying a moving context and a moving time of a user by acceleration information while the user is moving, the moving context representing a moving means of the user, the acceleration information being measured by an acceleration sensor carried with the user;
storing the moving context and the moving time in time series, in a memory;
setting a time sequence of the moving context and the moving time stored in the memory, from a moving start time to an arrival time to a destination, as a moving pattern from the moving start time;
setting a tag to the moving context in the moving pattern, the tag representing a place where the user exists and identifying a function to be executed at the place;
generating a moving estimation pattern as the moving pattern having the moving context and the moving time specified by acceleration information which is measured when the user is newly moving; and
executing the function identified by the tag, when the moving context set with the tag in the moving estimation pattern coincides with a moving context specified by acceleration information which is measured while the user is newly moving.

13. A non-transitory computer readable medium storing program codes for causing a computer to process information, the program codes comprising:
a first program code to specify a moving context and a moving time of a user by acceleration information while the user is moving, the moving context representing a moving means of the user, the acceleration information being measured by an acceleration sensor carried with the user;
a second program code to store the moving context and the moving time in time series, in a memory;
a third program code to set a time sequence of the moving context and the moving time stored in the memory, from a moving start time to an arrival time to a destination, as a moving pattern from the moving start time;
a fourth program code to set a tag to the moving context in the moving pattern, the tag representing a place where the user exists and identifying a function to be executed at the place;
a fifth program code to generate a moving estimation pattern as the moving pattern having the moving context and the moving time specified by acceleration information which is measured when the user is newly moving; and
a sixth program code to execute the function identified by the tag, when the moving context set with the tag in the moving estimation pattern coincides with a moving context specified by acceleration information which is measured while the user is newly moving.

* * * * *